April 4, 1933.  G. M. RAMSEY  1,903,352
HANDGRIP TESTING MACHINE
Filed June 26, 1931  4 Sheets-Sheet 1

G. M. Ramsey, INVENTOR
BY Victor J. Evans and Co. ATTORNEY

April 4, 1933.  G. M. RAMSEY  1,903,352
HANDGRIP TESTING MACHINE
Filed June 26, 1931  4 Sheets-Sheet 2
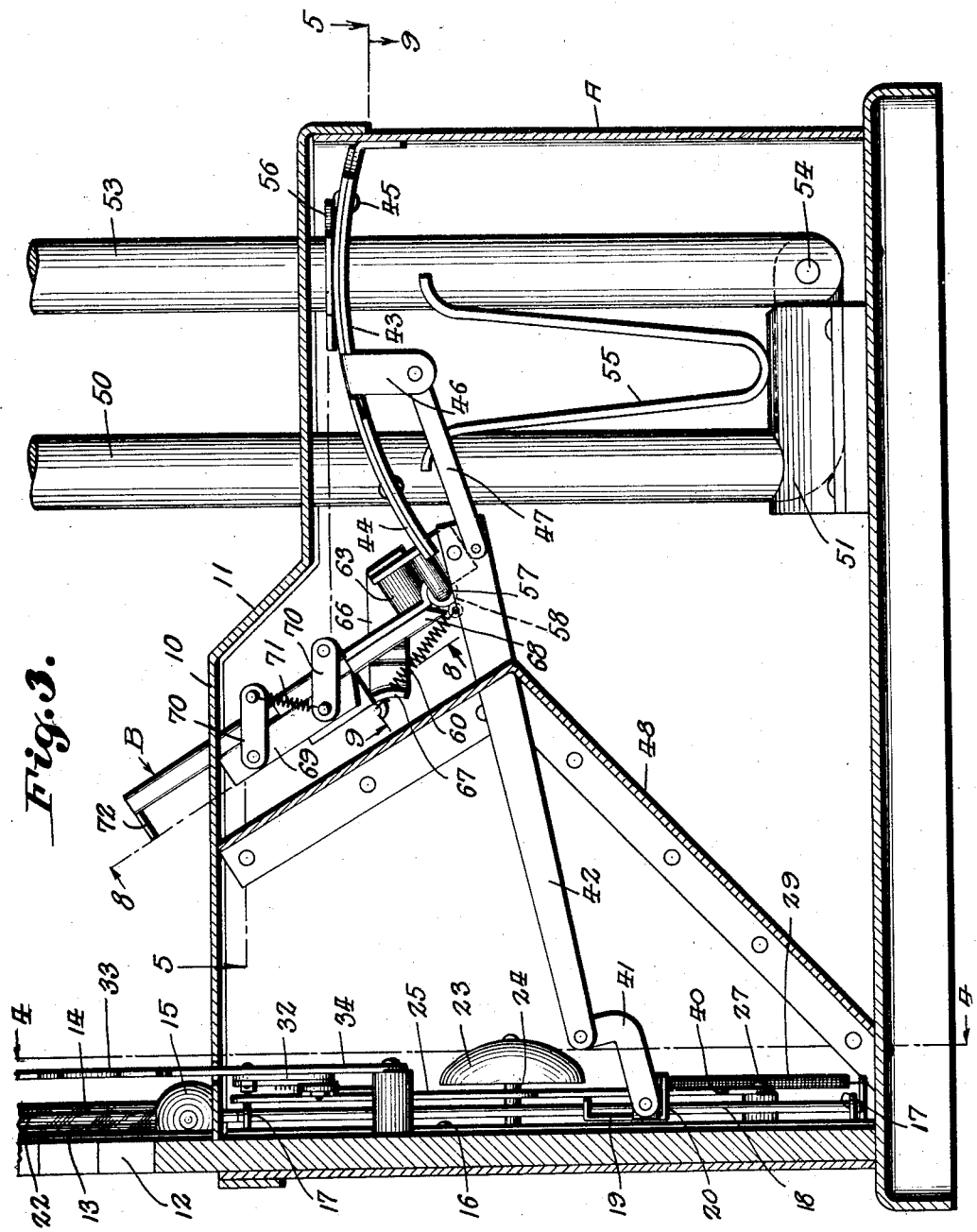
G. M. Ramsey, INVENTOR
BY Victor J. Evans
and Co.  ATTORNEY April 4, 1933. G. M. RAMSEY 1,903,352
HANDGRIP TESTING MACHINE
Filed June 26, 1931 4 Sheets-Sheet 3
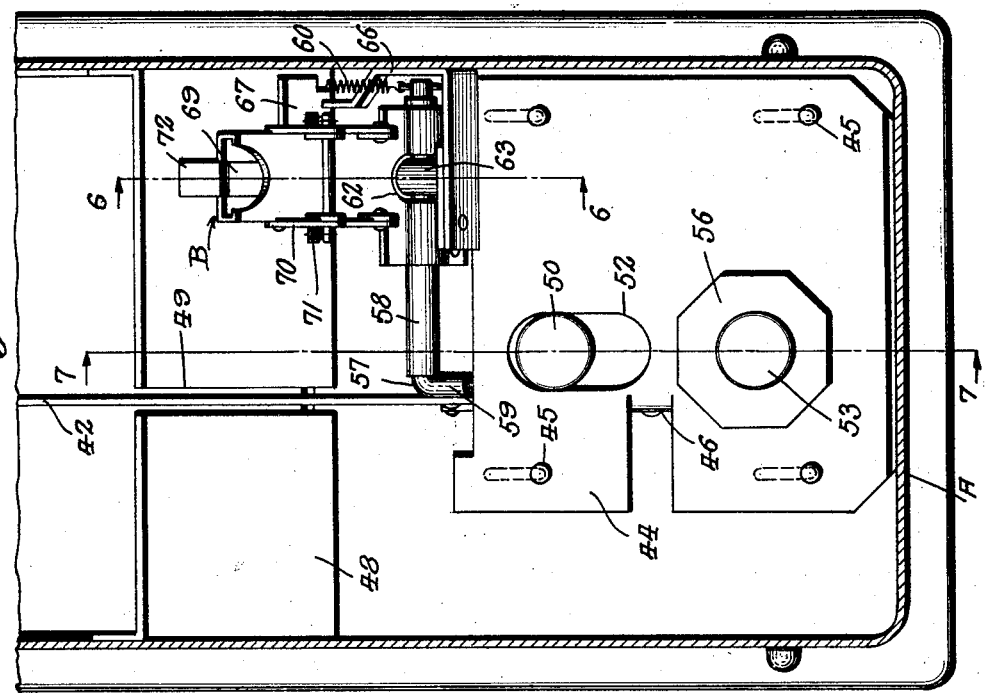
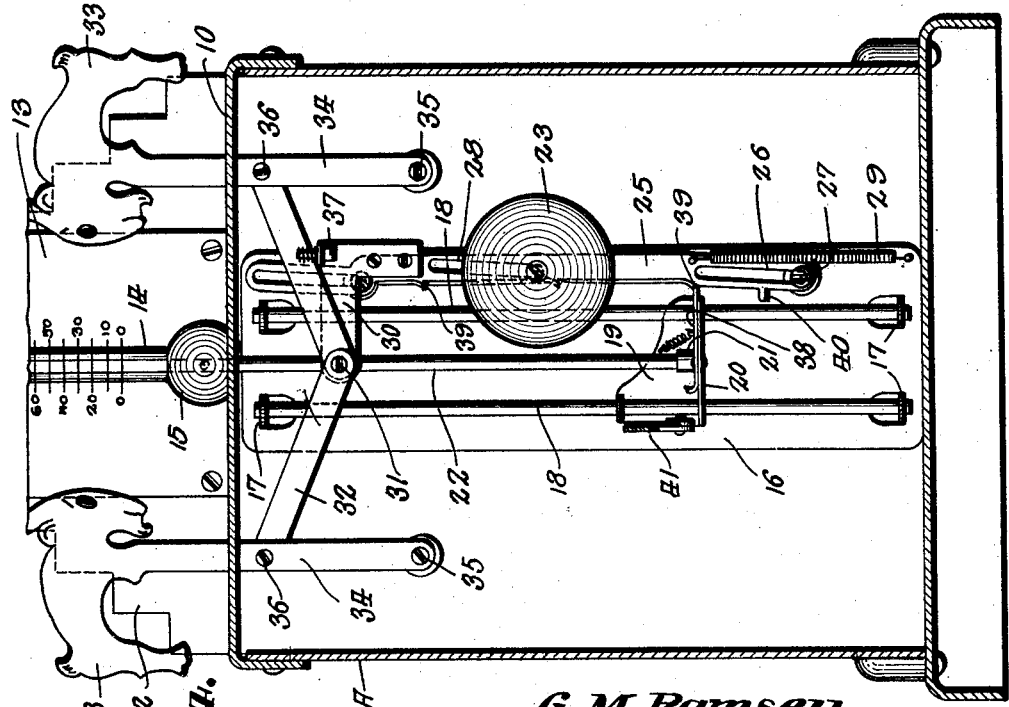
G. M. Ramsey, INVENTOR
BY Victor J. Evans and Co. ATTORNEY April 4, 1933.　　　G. M. RAMSEY　　　1,903,352
HANDGRIP TESTING MACHINE
Filed June 26, 1931　　　4 Sheets-Sheet 4
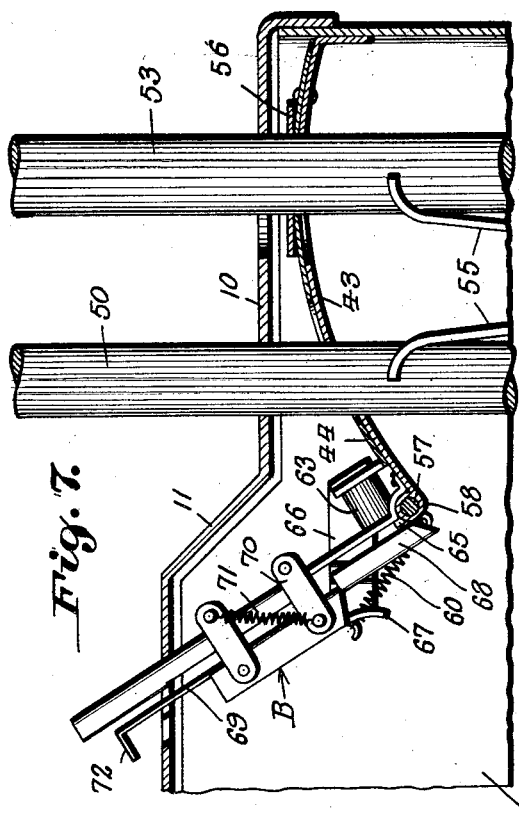
Fig. 7.
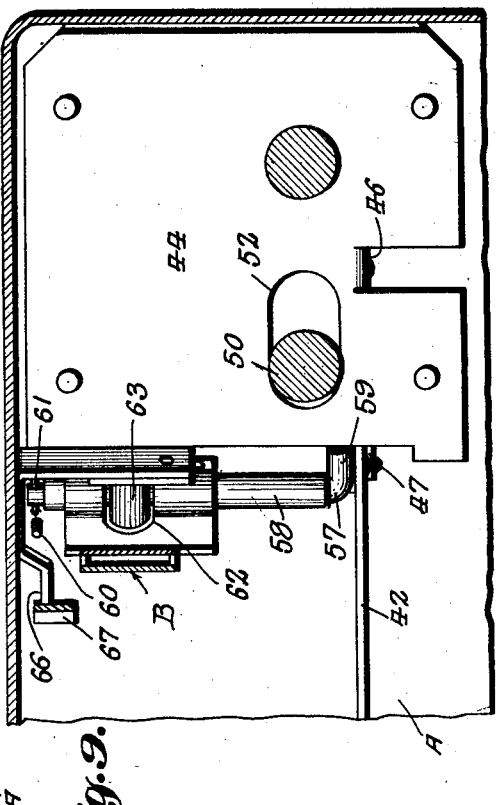
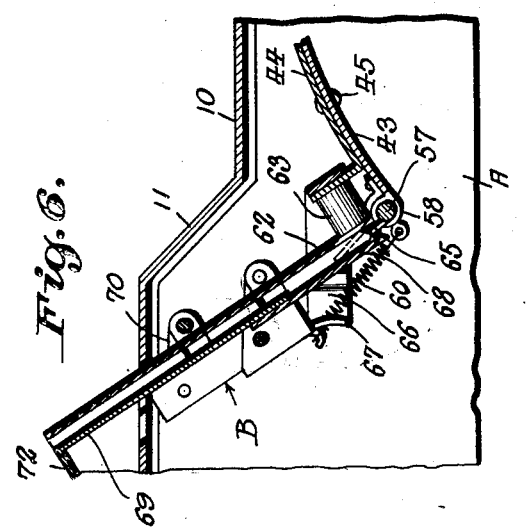
Fig. 6.
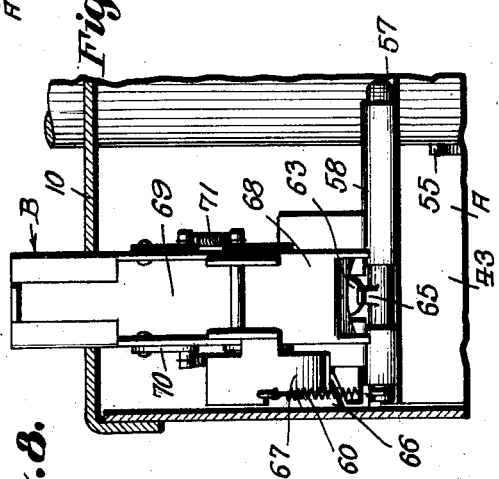
Fig. 8.
Fig. 9.
G. M. Ramsey, INVENTOR
BY Victor J. Evans and Co.
ATTORNEY Patented Apr. 4, 1933

1,903,352

UNITED STATES PATENT OFFICE

GEORGE M. RAMSEY, OF AMARILLO, TEXAS

HANDGRIP TESTING MACHINE

Application filed June 26, 1931. Serial No. 547,099.

The invention relates to a grip testing machine and more especially to a coin controlled hand grip testing apparatus.

The primary object of the invention is the provision of a machine or apparatus of this character wherein the same constitutes an improvement over the subject matter of an application for patent filed on or about August 1, 1930, bearing Serial No. 472,413, so that the said machine will operate to lend amusement thereto and attractiveness while in use.

Another object of the invention is the provision of a machine or apparatus of this character wherein the testing mechanism when operated will actuate images visible from without the machine and in this instance the images are imitative of butting goats which will automatically perform when the grip testing mechanism is in action and thus afford entertainment during the test.

A further object of the invention is the provision of a machine or apparatus of this character wherein the construction thereof is novel in form and generally improves the mechanism constituting the subject matter of the application filed on or about August 1, 1930, bearing Serial No. 472,413, with resultant efficiency for test purposes.

A still further object of the invention is the provision of a machine or apparatus of this character which is comparatively simple in construction, thoroughly reliable and efficient in its purpose, neat and attractive in appearance and serving as an amusement device, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 3 is a sectional view on the line 3—3 of Figure 1 looking in the direction of the arrow.

Figure 4 is a sectional view on the line 4—4 of Figure 3 looking in the direction of the arrow.

Figure 5 is a sectional view on the line 5—5 of Figure 3 looking in the direction of the arrow.

Figure 6 is a fragmentary sectional view on the line 6—6 of Figure 5 looking in the direction of the arrow.

Figure 7 is a sectional view on the line 7—7 of Figure 5 looking in the direction of the arrow.

Figure 8 is a sectional view on the line 8—8 of Figure 3 looking in the direction of the arrow.

Figure 9 is a sectional view on the line 9—9 of Figure 3 looking in the direction of the arrow.

Similar reference characters indicate corresponding parts throughout the several views in the drawings.

Figure 2:
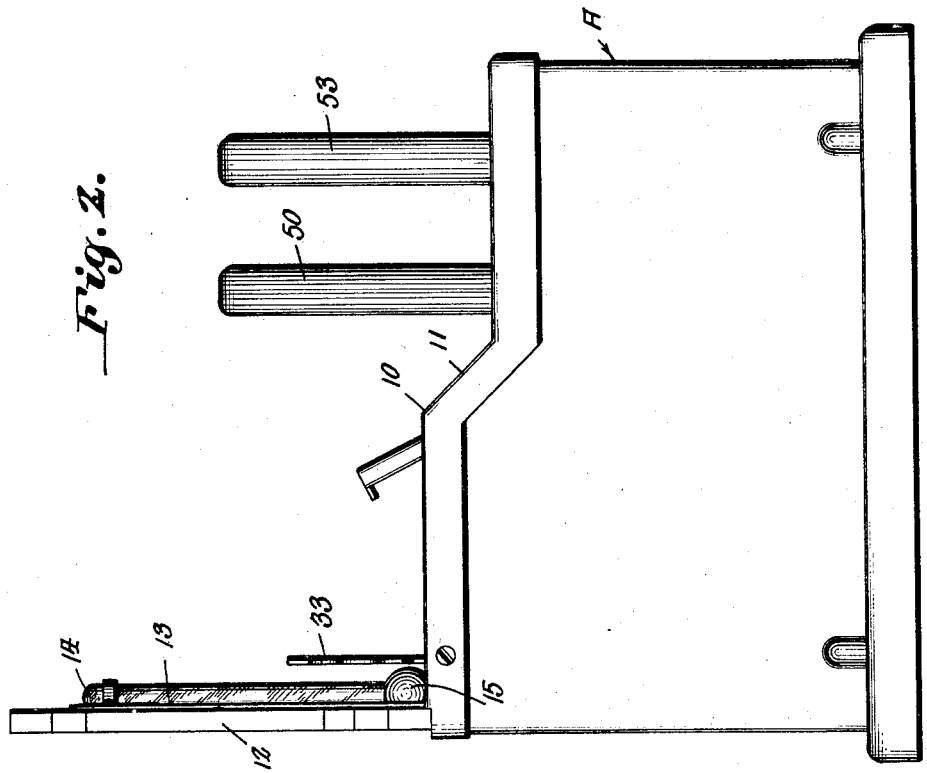
Figure 2 is a side elevation thereof.
Figure 1:
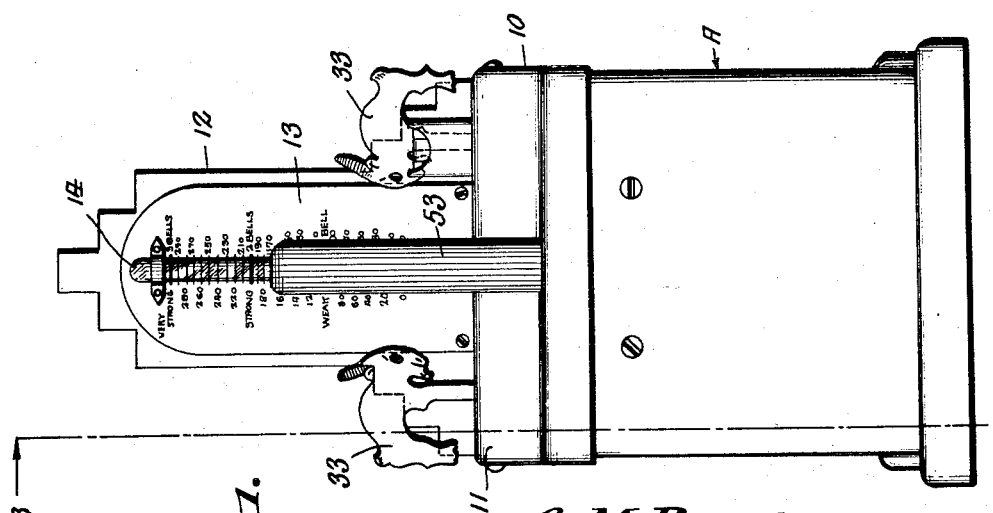
Figure 1 is a front elevation of the machine or apparatus constructed in accordance with the invention.

Referring to the drawings in detail, A designates generally the casing, the top 10 of which is preferably stepped so that its front or fore portion will be in a lower plane than its rear portion and therebetween is a forwardly inclined riser 11 for the displaying thereon of suitable reading matter in full view of the user of the machine. The rear wall or back 12 of the casing is extended upwardly a considerable distance above the top 10 of said casing and thereon at its forward face is carried a scale plate 13 with which is associated a tube 14 of glass, the latter and the said scale 13 being so arranged as to be imitative of a thermometer. This scale plate 13 is suitably marked with graduations and indicia indicative of grip test and appropriate therefor. A substantially spherical member 15 is located at the lower end of the tube 14 and suitably colored, for example red, to indicate mercury in the bulb part of a thermometer to give a realistic character to the tube 14 as a temperature thermometer.

Within the casing A on the back or rear wall 12 thereof beneath the scale plate 13 is a guide plate 16, the latter having cut and struck outwardly therefrom at the upper and lower end portions thereof supporting ears 17, these being arranged in pairs at the upper and lower ends of said plate and the ears of the plate being spaced the required distance apart. Mounted in these ears 17 are vertical guide rods 18 with which is slidably connected a runner or carriage 19 provided with a supporting ledge 20 on which is arranged a socketed lug 21 in which is received and made fast the lower end of an indicator column 22, the latter being slidable through the member 15 into the tube 14 and this column is colored indicative of a mercury column and is designed to coact with the markings on the scale plate 13 in the operation of the machine or apparatus.

Carried by the guide plate 16 is a bell 23, the supporting stem 24 of which is anchored in the said plate and spaced to one side of the guide rods 18 carried thereby. Movably connected with the guide plate 16 is a trip plunger 25, the lower end portion being formed with an elongated slot 26 receiving guide pin 27 projecting from the plate 16, while the upper portion of said plunger 25 is provided with a clearance slot 28 for the stem 24 of the bell 23, the plunger 25 being tensioned through the medium of a coiled retractile spring 29 connected thereto and to the plate 16.

The plunger 25 carries at its upper end an arm 30 disposed at right angles thereto and with which are pivoted at 31 the actuating links 32 for a pair of automatically performing images 33, these being arranged on opposite sides of the scale plate 13 and are exposed above the high part of the top 10, in this instance the images being imitative of butting goats. The images 33 are supported upon swinging levers 34, the lower ends of which are connected by pivots 35 to the back or rear wall 12 of the casing A within the latter, the links 32 being pivoted at 36 to these swinging levers 34. On movement of the plunger 26 the images 33 will automatically perform to move toward and away from each other according to the direction of movement of said plunger.

The arm 30 on the plunger 25 has mounted thereon a spring tensioned bell clapper 37 for the sounding of the bell 23 on the tripping of the plunger 25 in a manner presently described.

Carried by the ledge 20 of the carriage or runner 19 is a spring tensioned tripping member 38 which is adapted to intermittently engage and release latching lips 39, these being formed on the plunger 25 and are spaced a determined distance apart longitudinally thereof, the spacing being synchronous with pronounced scale markings on the scale plate 13 so that when the column 22 reaches these points of the scale plate the plunger 25 will be actuated by the tripping member 38 whereby the bell 23 will be sounded by the bell clapper 37 for the ringing of the bell according to the positioning of the column 22 with relation to the scale plate 13. The slots 26 and 28 in the plunger 25 move the latching lips 39 into and out of the path of the tripping member 38 for the automatic latching and releasing of the plunger. Thus as the runner or carriage 19 moves upwardly the tripping member 38 will strike the lowermost or first latching lip 39 on the plunger 25 and thus raise the latter and as the plunger moves upwardly it recedes laterally whereby the tripping member 38 will disengage with the latching lip 39 and the spring 29 acting upon the plunger will pull it downwardly and thus cause the bell clapper 37 to strike the bell 33 for the sounding thereof. On the continued upward movement of the runner or carriage 19 the tripping member 38 will again engage the next confronting latching lip 39 and thus the bell clapper 37 will strike the bell when the tripping member 38 and latching lip 39 are disengaged and the spring 29 then becomes active upon the plunger for the second stroke thereof and the second sounding of the bell. It is of course understood that any number of latching lips 39 may be provided on the plunger and in this way various soundings of the bell 23 may be had when the machine or apparatus is operated.

The plunger 25 at its lower end is provided with a locking lip 40 to be projected into the path of the downward movement of the carriage or runner 19 so that when the latter is in its lowermost position the said plunger will be locked against movement and in this way outside interference with the images 33 will be retarded so that the same cannot be manually performed. On the lowermost movement of the carriage or runner 19 the images are swung to the longitudinal center of the casing A with the heads of said images in butting attitude with respect to each other and these images 33 will perform synchronously in the working of the plunger 25 as it will be apparent that when the plunger is raised the images are swung outwardly away from each other and on the lowering of said plunger they will approach one another and on intervals therebetween the said images will be passive or at rest.

A link 41 connects the runner or carriage 19 with a lever 42 which is eccentrically pivoted to a curved plate 43 arranged in the front portion of the casing adjacent the top thereof. A second curved plate 44 is slidably supported on the first plate by the pin and slot connections shown generally at 45 so that said plate 44 can move rearwardly and a depending arm 46 on the top plate is connected by a link 47 to the lever 42 so that as the plate 44 moves forwardly, the lever 42 is swung upwardly, thus causing the link 41 to raise the carriage or runner 19 and thereby move the column 22 upwardly through the glass tube 14.

A substantially V-shaped partition 48 is arranged in the rear part of the casing and is slotted as shown at 49 and the lever passes through this slot which forms guiding means for the lever.

A vertically arranged bar 50 has its lower end supported by a bracket 51 connected with the bottom of the casing adjacent the front thereof and this bar passes through holes in the lower plate 43 and in the cover or top 10 and it also passes through an elongated slot 52 in the top plate 44. A parallel bar 53 is arranged in front of the bar 50 and passes through an elongated slot in the cover, a hole in the top plate and an elongated slot in the bottom plate and has its lower end pivotally connected to the reduced and bent end of the other bar as shown at 54. A substantially U-shaped spring 55 is placed between the bars and rests upon the bracket 51, this spring tending to hold the bars apart. The bars 50 and 53 project a considerable distance above the casing and form hand grips and as will be seen, when the bars are gripped by the hand and pressure exerted upon the bars, the bar 53 will be moved toward the bar 50, this movement of the bar 53 imparting movement to the plate 44 so that the arm 46 of this plate will cause the link 47 to swing the lever 42 upwardly so that the carriage or runner 19 and the column 22 will indicate on the scale 13 the pressure exerted to move the bar 53 so that one can tell how much grip he has in his hand. As before stated, at certain points in the upward movement of the runner or carriage 19 the bell 23 will be sounded and the scale has its indicia thereon to indicate the point at which the bell will ring or be sounded.

A small plate 56 has a hole therein through which the rod 53 passes and this plate is seated on the top plate and is painted the same color as the top of the casing so as to obliterate to a marked degree the slot provided in the top of said casing for a clearance for the bar 53 in the movement thereof.

There is also provided means for preventing the use of the machine or apparatus until a coin, such as a penny, is deposited in the same. A shaft 57 is journaled in a bearing part 58 formed at the rear end of the bottom plate 43 and has one end bent forwardly as shown at 59 to form a lock for preventing movement of the top plate 44 as said bent end will engage the rear edge of the plate 44 under the action of a spring 60 which is connected with an arm 61 on the outer end of the shaft and to part of a coin chute B. The coin chute extends diagonally from the rear end of the bottom plate through the top of the casing so that a coin placed in the chute will drop down the same and come to rest opposite a hole 62 in the bottom of the chute and through which passes a plunger 63 carried by the rear part of the plate 44.

The coin will also engage a projection 65 on the shaft 57 so that at the beginning of the movement of the plate 44 under the action of the handle member 53, the plunger 63 will strike the coin and cause it to bear against the projection 65 and thus rock the shaft so that its bent end 59 will be moved out of the path of the top plate 44, thus permitting movement of the parts. Unless a coin is dropped in the chute the shaft will not be moved by the plunger as the plate 44 cannot be moved a sufficient distance to cause the plunger to engage the projection 65. As the plate 44 moves rearwardly a projection 66 thereon will strike a part 67 on a door 68 which forms the lower part of the chute so that the door will swing open and thus permit the coin to drop from the chute. The spring 60 acts to hold the door in closed position. The rear part 69 of the chute is connected to the front part by the pivot links 70 which are normally held in a position with the rear part against the front part by the springs 71. The door is carried by the rear part and said rear part is formed with a handle portion 72 at its upper end which passes through the top of the casing so that by pressing upon this handle part the links will be partly rotated and thus cause the rear part to move downwardly and rearwardly away from the front part. This arrangement will permit coins that may get caught in the chute to be released therefrom as the outward movement of the rear part in the door will permit such coins to drop through the chute.

From the foregoing it will be seen that when one grips the handle bars and exerts pressure thereon the bar 53 will be moved toward the stationary bar and this movement will be communicated to the column 22 so that said column will move upwardly in the glass tube 14, the upper end of the column 22 indicating on the scale 13 the amount of movement of the handle bar or the grip of the hand on the bar. Also simultaneously with the rise of the column 22 the images 33 will perform to be imitative of butting goats and as before stated the column 22 will have the appearance in this upward movement within the tube 14 to simulate the rising of mercury in a thermometer.

It will also be seen that the machine or apparatus cannot be actuated until a coin is dropped in the chute.

What is claimed is:—

1. In a machine of the character described, a runner, movable images supported for butting action and adapted to perform opposite each other, mechanism operable by the runner to automatically effect the performance of the images, means releasable by a coin to permit actuating the runner and constituting grips, and means for locking the last named mechanism when the runner is in lowermost position.

2. In a machine of the character described, a runner, grip means operative to move the runner, movable images supported for butting action and adapted to perform opposite each other, mechanism operable by the runner to automatically effect the performance of the images, means for locking the last named mechanism when the runner is in lowermost position, and an audible means as a signal automatically operated by said first named mechanism.

In testimony whereof I affix my signature.

GEORGE M. RAMSEY.